United States Patent [19]
Axelrod

[11] Patent Number: 6,086,940
[45] Date of Patent: *Jul. 11, 2000

[54] HIGH STARCH CONTENT DOG CHEW

[75] Inventor: Glen S. Axelrod, Mahwah, N.J.

[73] Assignee: T.F.H. Publications, Inc., Neptune City, N.J.

[*] Notice: This patent is subject to a terminal disclaimer.

[21] Appl. No.: 08/993,748

[22] Filed: Dec. 19, 1997

Related U.S. Application Data

[63] Continuation-in-part of application No. 08/738,423, Oct. 25, 1996, Pat. No. 5,827,565.

[51] Int. Cl.$^7$ .................................................... A23K 1/00
[52] U.S. Cl. .......................... 426/623; 426/630; 426/635; 426/805
[58] Field of Search .................. 426/623, 630, 426/635, 805

[56] References Cited

U.S. PATENT DOCUMENTS

| | | | |
|---|---|---|---|
| 3,821,446 | 6/1974 | Estey et al. | 426/373 |
| 3,899,607 | 8/1975 | Miller et al. | 426/285 |
| 4,032,665 | 6/1977 | Miller et al. | 426/104 |
| 4,171,383 | 10/1979 | Chwalek et al. | 426/623 |
| 4,310,558 | 1/1982 | Nahm, Jr. | 426/98 |
| 4,315,034 | 2/1982 | Levinson et al. | 426/104 |
| 4,419,372 | 12/1983 | Greene et al. | 426/104 |
| 4,735,808 | 4/1988 | Scaglione et al. | 426/62 |
| 4,784,860 | 11/1988 | Christensen et al. | 426/46 |
| 4,800,099 | 1/1989 | Gellman et al. | 426/641 |
| 4,886,440 | 12/1989 | Forrest et al. | 425/208 |
| 4,892,748 | 1/1990 | Andersen et al. | 426/635 |
| 4,997,671 | 3/1991 | Spanier | 426/646 |
| 5,000,973 | 3/1991 | Scaglione | 426/549 |
| 5,094,870 | 3/1992 | Scaglione | 426/549 |
| 5,200,212 | 4/1993 | Axelrod | 426/2 |
| 5,240,720 | 8/1993 | Axelrod | 426/2 |
| 5,296,209 | 3/1994 | Simone et al. | 424/49 |
| 5,339,771 | 8/1994 | Axelrod | 119/710 |
| 5,419,283 | 5/1995 | Leo | 119/709 |
| 5,476,069 | 12/1995 | Axelrod | 119/709 |
| 5,591,491 | 1/1997 | Ando | 427/544 |

FOREIGN PATENT DOCUMENTS

| | | |
|---|---|---|
| 2705864 | 6/1993 | France . |
| 3701861 | 8/1988 | Germany . |
| 19501142 | 7/1995 | Germany . |

*Primary Examiner*—Chhaya D. Sayala
*Attorney, Agent, or Firm*—Hayes, Soloway, Hennessey, Grossman & Hage, P.C.

[57] ABSTRACT

A hardness modifiable edible dog chew produced by extruding a vegetable starch mixture into beads and then injection molding the beads into the shape of the dog chew. The mixture includes lecithin, calcium carbonate and optionally a dog attractant. The hardness of the dog chew can be varied by subjecting it to expansion by microwaving

13 Claims, 1 Drawing Sheet

HIGH STARCH CONTENT DOG CHEW

This is a Continuation-In-Part of Ser. No. 08/738,423 filed Oct. 25, 1996 now U.S. Pat. No. 5,827,565.

BACKGROUND OF THE INVENTION

1. Field of the Invention

The present invention relates to dog chews, and more particularly, pertains to a starch-based, completely digestible, nutritious dog chew, the texture or hardness of which is easily modified by microwaving to meet the chewing requirements of a particular dog.

2. Brief Description of the Prior Art

Most dogs enjoy chewing on things, although preferences vary as to the hardness of the substances favored. Some dogs like to chew on very hard materials such as cow bones, wood, nylon, others prefer softer chews such as polyurethane or rubber while still others favor freeze dried snacks. Some dogs, due to their age, may not be able to chew on the very hard substances. Young dogs have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof can have an adverse effect on the dogs digestion and can become impacted in the dog's intestinal tract with life-threatening consequences. By way of example, dog chews have been marketed which utilize an ethylene copolymer which can be fractured by the chewing action of a dog, and when ingested can block the dog's stomach passages. Other edible dog chews have been marketed which have a comparatively short shelf life and therefore must be replaced by retail outlets at frequent intervals.

There has been previously developed an edible dog chew that is wholly digestible, nutritious and having a texture or hardness which is individually adjustable by the application of heat to suit a wide variety of dog's preferences or needs. Such dog chews utilize a mixture containing primarily casein and are disclosed in Herbert R. Axelrod U.S. Pat. Nos. 5,200,212 and 5,240,720. These dog chews, while constituting a major improvement over other prior art edible dog chews, do not provide all the advantages of the dog chew of the present invention.

SUMMARY OF THE INVENTION

The present invention provides an edible dog chew that is completely digestible, nutritious, devoid of deleterious additives and of a modifiable texture or hardness that is quickly and easily tailorable by the owner to suit the need or preference of his particular dog. In addition, such edible dog chews have a long shelf life as compared to prior edible dog chews. Upon removal from the chew's package, the chew can be caused to swell up to about 4 to 8 times its original volume, if desired, by subjecting it to microwave radiation. With this procedure, the chew's texture or hardness can be adjusted to any magnitude from its original high density extremely hard state to a low density expanded easily chewed state depending upon the amount of microwave exposure to which it is subjected. Accordingly, the chew can thereby be quickly and easily modified to the texture preference of a wide variety of dogs from a strong large healthy dog to a small puppy with puppy teeth or an older dog with decayed molars.

The dog chew of the present invention incorporates a significantly greater percentage of vegetable starch than had heretofore been possible to obtain in a injection molded dog chew product. It has been found that by incorporating approximately 2% by weight lecithin, a mixture containing up to 94% starch by weight can be injection molded. Calcium carbonate is also preferably added as well as various vegetable fibers, vegetables gums and attractants.

The dog chew of the present invention can be formulated to the starch/protein requirements of the diet of a particular dog to thereby contribute to the health of such dog.

The dog chew of the present invention is formed by first extruding the major ingredients thereof into beads or pellets, which are then introduced into an injection molding machine to be formed in a desired configuration such as a simulated dog bone. It is essential for proper molding to occur that such ingredients first be extruded into beads before being injection molded.

Other features and advantages of the present invention will become apparent from the following detailed description taken in conjunction with the accompanying drawings which illustrate by way of example the principles of the invention.

DETAILED DESCRIPTION OF PREFERRED EMBODIMENTS

Figure 1:
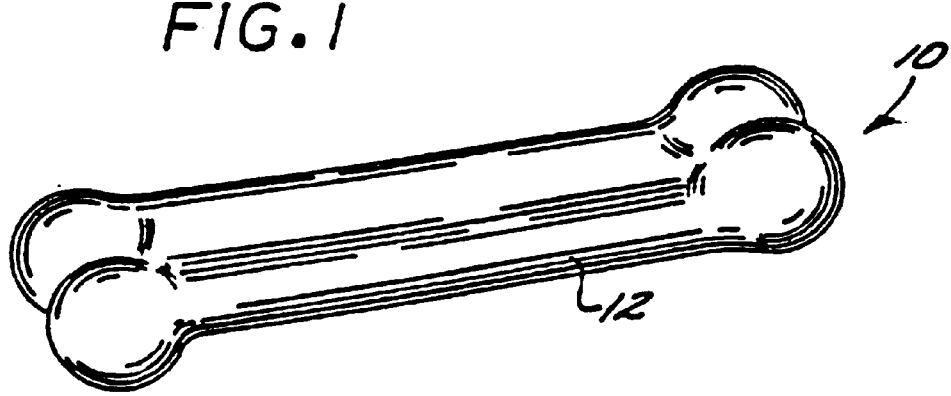
FIG. 1 illustrates a preferred embodiment of an edible dog chew embodying the present invention in its unexpanded state.

The preferred form of edible dog chew of the present invention is predominantly composed of a vegetable starch or a vegetable starch and a vegetable flour selected from any number of sources including but not limited to corn, rice, wheat, potato and tapioca.

The starch constituent of the dog chew, which may comprise up to 94% by weight of the ingredients that are combined, is blended with about 2% of lecithin by weight to facilitate extruding and injection molding of the dog chew. About 4–6% by weight of calcium carbonate may also be added to facilitate extrusion and serve as a nutritional source of calcium. Optionally, vegetable fibers and vegetable gums may be added to provide consistency of texture, increased flexibility and nutritional value. Spinach and carrots in an amount of 5–10% by weight are suitable as a source of such vegetable fibers and gums. Various dog attractants in an amount of 1–3% by weight such as chicken powder, liver powder, beef, ham, turkey or fish can optionally be added. Vitamins can also be added in an amount varying from a trace to about 2% by weight.

In a preferred method of making dog chews of the present invention a vegetable starch or a combination of vegetable starches is extruded into beads or pellets of about 3–10 millimeters in size in a conventional extruder. Water is added to the starch during the extrusion step so that the water content of the beads is about 12% by weight. Lecithin and calcium carbonate are also added to the starch during the extrusion step so that the lecithin content of the bead is about 2% by weight and, the calcium carbonate is about 4–6% by weight. The beads are then introduced into a conventional injection molding machine. Vegetable fibers and vegetable gums, a dog attractant and optimally vitamins can also be added to the bead mixture while the beads are in the injection molding machine. The injection molding machine should have a barrel temperature of between 250–400° F. and a molding pressure of about 1000–2500 psi depending upon the injection molding machine utilized, the material added, the materials location, the machine, the type of additives and the size and shape of the mold. The heat and pressure causes most of the bead particles to melt and also sterilizes the mixture, while the commensurate liquification ensures a relatively homogeneous mixture of vegetable matter, lecithin, calcium carbonate, attractants, and any other additives. Homogeneity is most desirable as clumps of high concentrations of certain vitamins for example could be deleterious to the dog's health. The product may be molded into any of a variety of shapes, including for example, the general shape of a bone. After the particle mixture in the mold has been molded to the desired shape, it is cooled sufficiently to cause the molded form to solidify, thereby to allow it to be ejected or extracted from the mold. Upon ejection from the injection molding machine the moisture content of the dog chew is about 11% by weight.

A second method involves mixing the ingredients noted above into the bead during the extrusion process prior to injection molding. The resulting beads are then fed into the injection molding machine.

It has been found that the vegetable starch-based dog chew of the present invention can utilize at least about 90% by weight of a vegetable starch. The starch component may be obtained from a single vegetable, or alternatively, a combination of vegetables, e.g. potato and corn starch, corn starch and rice starch, etc., depending upon availability, the cost factors, and the desired taste variability of the dog chew. The vegetable starch component can be obtained by a wet mill process wherein the vegetable is soaked until soft and the outer shell is then removed. The vegetable protein component can be obtained by grinding down a dried vegetable to the consistency of a flour. With this latter process, there is provided both a vegetable starch component and a vegetable protein. It is a feature of the present invention that a dog chew can be formulated to the starch/protein requirements of the diet of a particular dog so as to contribute to the health of such dog. Thus, it is known that a diet too high in protein can increase the load on a dog's liver or kidney's. By adjusting the ratio of vegetable starch obtained by the wet mill process, and the vegetable protein obtained in the dry grinding process, a dog chew having the desired percentage of starch to protein can be provided.

As an example of a method of making a dog chew embodying the present invention, cornstarch in the amount of 94% by weight was mixed with lecithin in the amount of about 2% by weight and calcium carbonate in the amount of 4–5% by weight. Water was added to bring the mixture to 12% relative moisture, and the product was extruded as beads. The beads where then mixed with 2% liver meal and injection molded. Upon ejection from the injection molding machine, the moisture content of the resulting dog chew was about 11%.

Another example utilized a vegetable starch mixture of about 15% corn starch, 78% potato starch, with about 2% lecithin and 5% calcium carbonate by weight was formed into beads in an extruder to which 1–2% by weight of a dog attractant such as liver meal, chicken meal or fish meal was added in an injection molding machine.

In both examples, the pressure in the injection molding machine varied between 1,500 and 2,000 psi and the temperature varied between 250–280° F.

The completed dog chew may be shipped and sold in a shock-resistant package to prevent breakage of the chew should the package be dropped. A fluted package made of synthetic plastic has been found satisfactory.

Figure 2:
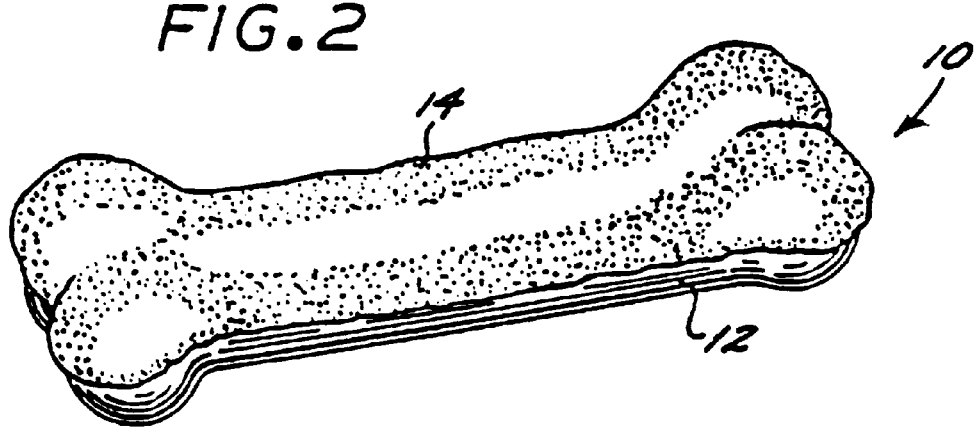
FIG. 2 illustrates the dog chew of FIG. 1 in its partially expanded state.
Figure 3:
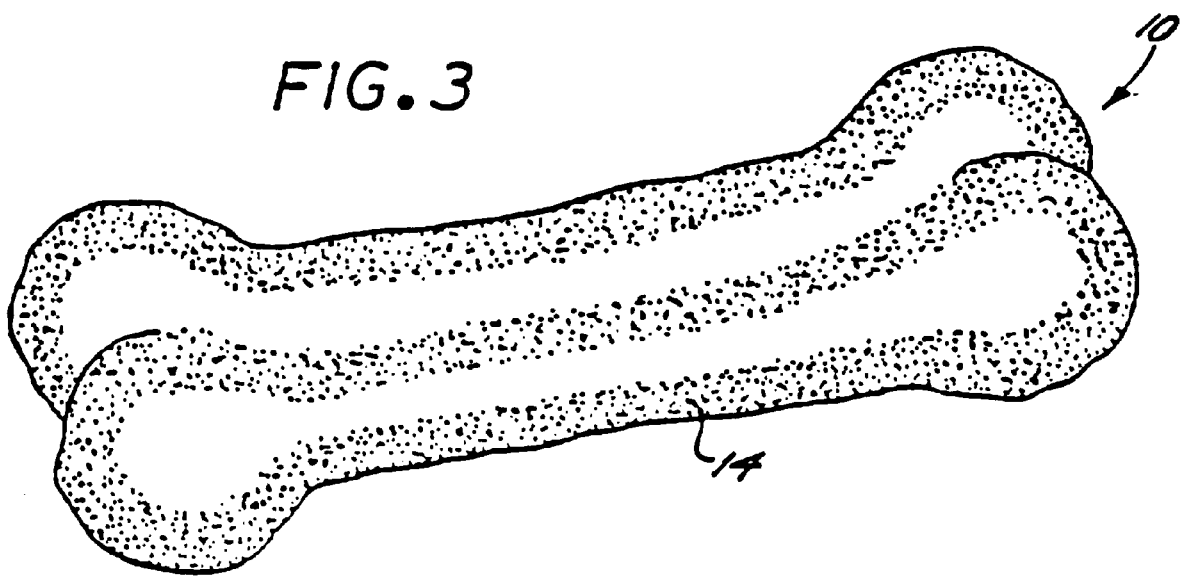
FIG. 3 illustrates the dog chew of FIG. 1 in a more expanded state.

Upon removal from the package, the person feeding the dog can modify the texture or hardness of the molded chew by heating, preferably in a microwave oven. The expansion of the moisture within the chew causes the chew to expand. Subjecting the chew to microwave radiation facilitates the heating of areas deep within the chew at the same time the exterior heats up and expands. FIG. 1 illustrates the chew 10 prior to heating, in which state it has a substantially smooth exterior surface 12 and is of an extremely hard texture preferred by some dogs. A short exposure to microwave radiation initiates the expansion process. FIG. 2 illustrates the chew 10 in a partially expanded state evidenced by partially bubbled surface 14. In this state the chew 10 is of an intermediate hardness preferred by other dogs. FIG. 3 illustrates the chew 10 in a more expanded state as may result from a 25 seconds to 1 minute exposure in a standard household microwave oven, depending upon the size of the bone and the power setting of the oven. The entire chew 10 has a bubbled surface 14 and is easily chewable by most dogs. The chew in this state is ideal for small dogs with puppy teeth or old dogs who suffer from gum disease or may have lost teeth. Sufficient exposure to microwave radiation will cause the chew to expand up to about 4 to 8 times its original volume with a commensurate reduction in hardness.

In use, the chew is given to the dog in its initial hardness state. If the dog is unwilling or is unable to chew on it, the chew is microwaved for short time increments and re-offered to the dog until the chew reaches a state of expansion and degree of hardness preferred by the dog. Large, strong and healthy dogs would probably prefer the chew in its unmodified and hardest state, while very small, young or very old dogs would prefer the chew in its most expanded state.

It should be particularly noted that an edible dog chew made in accordance with the present invention does not dry out and fall apart after being packaged and accordingly can have a shelf life of several years without being packaged in a waterproof container.

While a particular form of the invention has been illustrated and described it will be apparent to those skilled in the art that various modifications can be made without departing from the spirit and scope of the invention. Accordingly, it is not intended that the invention be limited except as by the appended claims.

What is claimed is:

1. A method of producing a hardness-modifiable edible dog chew, comprising the steps in sequence of:

mixing vegetable starch, about 2% lecithin, and about 4–6% calcium carbonate, wherein said mixture comprises about 90–94% by weight vegetable starch;

adjusting the moisture content of said mixture to about 12% by weight;

extruding said mixture into beads of about 3–10 millimeters;

injection molding the beads into the shape of a dog chew, such injection molding causing most of the beads to melt and sterilizing the ingredients of the beads;

cooling the resulting dog chew; and ejecting the dog chew wherein said water content, subsequent to injection molding is adjusted below 12% by weight.

2. The method of claim 1 wherein the lecithin content of the mixture is about 2% and the calcium carbonate content is about 4–6%.

3. The method of claim 1 including the further step of adding a dog attractant to the beads.

4. The method of claim 1 including the further step of adding vegetable fibers and gums to the beads.

5. The method of claim 1 wherein the injection molding takes place at a temperature of between 250–400° F. and a molding pressure of about 1000–2500 PSI.

6. The method of claim 1 wherein vitamins are added to the beads.

7. The method of claim 1 wherein the dog chew is in the shape of a bone.

8. The method of claim 1 wherein the vegetable starch is obtained from a combination of vegetables.

9. The method of claim 2 including the further step of adding vegetable fibers and gums to the beads.

10. The method of claim 2 wherein the injection molding takes place at a temperature of between 250–400° F. and a molding pressure of about 1000–2500 PSI.

11. The method of claim 5 wherein the dog chew is in the shape of a bone.

12. The method of claim 5 wherein the vegetable starch is obtained from a combination of vegetables.

13. A method of producing a hardness-variable edible dog chew, having a desired percentage of starch and protein components, comprising the steps in sequence of:

extruding a mixture of vegetable starch and vegetable protein, about 2% lecithin, about 4–6% calcium carbonate and water into beads of about 3–10 millimeters, wherein said vegetable starch is present in an amount of at least 90 percent by weight and wherein said water content of said beads is about 12% by weight;

injection molding the beads in an injection molding machine so as to melt and sterilize the ingredients of the beads;

cooling the molded dog chew while in the injection molding machine until the molded dog chew solidifies; and ejecting the dog chew from the injection molding machine and said water content subsequent to injection molding is below 12% by weight.

* * * * *